United States Patent
Khalil et al.

(10) Patent No.: US 10,079,566 B1
(45) Date of Patent: Sep. 18, 2018

(54) PULSE INJECTION CURRENT PATTERN FOR ROTOR POSITION ESTIMATION

(71) Applicant: Caterpillar Inc., Peoria, IL (US)

(72) Inventors: Ahmed Khalil, Dunlap, IL (US);
Seok-Hee Han, Dunlap, IL (US);
Jackson Wai, Dunlap, IL (US); James Michael Thorne, Peoria, IL (US); Jesse Gerdes, Dunlap, IL (US);
Sangameshwar Sonth, Dunlap, IL (US)

(73) Assignee: Caterpillar Inc., Deerfield, IL (US)

(*) Notice: Subject to any disclaimer, the term of this patent is extended or adjusted under 35 U.S.C. 154(b) by 0 days.

(21) Appl. No.: 15/649,778

(22) Filed: Jul. 14, 2017

(51) Int. Cl.
*H02P 6/00* (2016.01)
*H02P 25/08* (2016.01)
*H02P 6/18* (2016.01)

(52) U.S. Cl.
CPC .............. *H02P 25/08* (2013.01); *H02P 6/18* (2013.01)

(58) Field of Classification Search
CPC ... G05B 11/28; H02P 1/46; H02P 3/18; H02P 27/04; H02P 27/06; H02P 41/00; H02P 27/00; H02P 23/00; H02P 25/00; H02P 25/08; H02P 6/00; H02P 1/00
USPC ..... 318/400.33, 400.32, 701, 700, 705, 721, 318/799, 800, 801, 430, 432, 437; 388/800, 823, 834
See application file for complete search history.

(56) References Cited

U.S. PATENT DOCUMENTS

| | | | |
|---|---|---|---|
| 7,960,931 B2* | 6/2011 | Rodriguez | H02P 6/085 318/432 |
| 8,610,389 B2 | 12/2013 | Lee et al. | |
| 8,866,433 B2 | 10/2014 | Gerdes et al. | |
| 9,041,328 B2 | 5/2015 | Richards et al. | |
| 9,893,665 B2* | 2/2018 | Yang | H02P 21/0007 |
| 2014/0327379 A1* | 11/2014 | Yang | H02P 6/18 318/400.02 |

FOREIGN PATENT DOCUMENTS

| | | |
|---|---|---|
| CN | 101769998 | 7/2010 |
| CN | 203708134 | 7/2014 |
| CN | 104579040 | 4/2015 |
| CN | 105703680 | 6/2016 |
| WO | 2016045920 | 3/2016 |

* cited by examiner

*Primary Examiner* — Antony M Paul
(74) *Attorney, Agent, or Firm* — Jeff A. Greene

(57) ABSTRACT

A system and method for estimating a position and a speed of a rotor of a Switched Reluctance (SR) machine is provided. The SR machine comprises the rotor, a stator and at least one winding. The method includes generating a diagnostic pulse having a trapezoidal shape. The method further includes injecting a diagnostic pulse into the at least one winding of the SR machine. The method further includes measuring an actual stator current flowing through the at least one winding of the SR machine. The method further includes computing an estimated stator current flowing through the at least one winding using observer-based estimation technique. The estimated stator current is compared with the actual stator current to compute an error signal. At least one of the position and the speed of the rotor is estimated based on the error signal.

20 Claims, 8 Drawing Sheets

PULSE INJECTION CURRENT PATTERN FOR ROTOR POSITION ESTIMATION

TECHNICAL FIELD

The present disclosure relates to switched reluctance machines. More particularly, the present disclosure relates to methods and systems for estimating a position and a speed of a rotor of a switched reluctance machine.

BACKGROUND

Switched reluctance (SR) machines are widely used for various motor control applications due to its rugged and robust construction. Currently known systems and methods for controlling performance of SR machines use various electrical and/or mechanical parameters associated with the SR machine. Among other parameters, proper determination of the position of the rotor relative to the stator of the SR machine, while at rest or at an otherwise substantially low machine speed, is important to the performance and efficiency of the SR machine. The position information for the SR machine is usually, obtained from a position sensor, often a shaft-mounted encoder or resolver, which adds to cost and complexity of the overall drive system.

Sensorless operation is a key aspect of operation of the SR machine. Sensorless operation is important for various applications due to the need for minimum package size, high reliability and low cost for SR machine driven actuators. Reliable and accurate position sensing for switched reluctance motors is a key step towards developing low-cost, high-performance SR machine drives.

Typical methods of estimating rotor position involve injecting a triangular current pulse into one or more idle phases of the stator. A stator current flowing through the idle phases is then estimated using an observer-based estimation approach. The estimated stator current is compared with an actual stator current to generate an error signal. The error signal is used to compute an estimated position of the rotor and an estimated speed of the rotor. However, typically there is a delay between the actual stator current and the estimated stator current. This may result in a weak error signal i.e. the error signal may not be biased towards one of the positive or negative sides. The weak error signal may cause problems with the convergence of the error signal.

Accordingly, there is a need to provide a method and a system for estimating a position and a speed of the rotor of the SR machine that enables more efficient operation and better performance of the SR machine.

SUMMARY

In an aspect of the present disclosure, a method of estimating a position and a speed of a rotor of a Switched Reluctance (SR) machine is provided. The SR machine comprises the rotor, a stator and at least one winding. The method includes generating, by a controller, a diagnostic pulse for the SR machine, wherein the diagnostic pulse is a trapezoidal waveform. The method includes injecting, by the controller, a diagnostic pulse into the at least one winding. The method further includes measuring, by the controller, an actual stator current flowing through the at least one winding of the SR machine. The method further includes computing, by the controller, an estimated stator current flowing through the at least one winding using observer-based estimation technique. The method further includes comparing, by the controller, the estimated stator current with the actual stator current to compute an error signal. The method further includes estimating, by the controller, at least one of the position and the speed of the rotor based on the error signal.

In another aspect of the present disclosure, a controller for estimating a position and a speed of a rotor of a switched reluctance (SR) machine is provided. The SR machine comprises the rotor, a stator and at least one winding. The controller is electrically coupled to the SR machine. The controller is configured to generate a diagnostic pulse for the SR machine, wherein the diagnostic pulse is a trapezoidal waveform. The controller is further configured to inject the diagnostic pulse into the at least one winding. The controller is further configured to measure an actual stator current flowing through the at least one winding of the SR machine. The controller is further configured to compute an estimated stator current flowing through the at least one winding using observer-based estimation technique. The controller is further configured to compare the estimated stator current with the actual stator current to compute an error signal. The controller is further configured to estimate at least one of the position and the speed of the rotor based on the error signal.

In yet another aspect of the present disclosure, an electric drive comprising a switched reluctance (SR) machine and a controller is provided. The switched reluctance machine comprises a stator, a rotor and at least one phase winding. The rotor is rotatably disposed in proximity to the stator. The electrical drive further comprises a controller in electrical communication with the SR machine. The controller is configured to generate a diagnostic pulse, wherein the diagnostic pulse is a trapezoidal waveform. The controller is further configured to inject the diagnostic pulse into the at least one winding. The controller is further configured to measure an actual stator current flowing through the at least one winding of the SR machine. The controller is further configured to compute an estimated stator current flowing through the at least one winding using observer-based estimation technique. The controller is further configured to compare the estimated stator current with the actual stator current to compute an error signal. The controller is further configured to estimate a position and a speed of the rotor based on the error signal.

DETAILED DESCRIPTION

Figure 1:
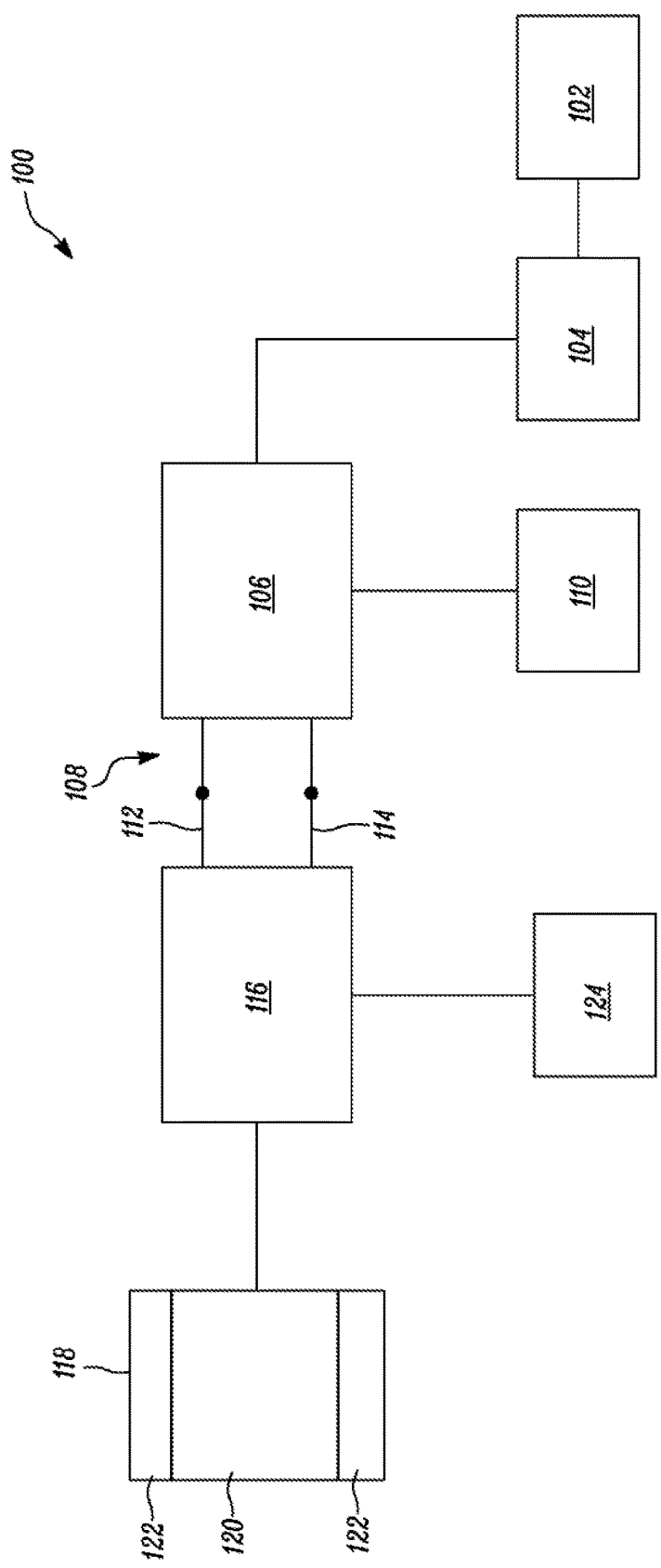
FIG. 1 is a schematic illustration of an exemplary embodiment of an electric drive comprising a switched reluctance (SR) machine.

Wherever possible, the same reference numbers will be used throughout the drawings to refer to same or like parts. FIG. 1 schematically illustrates various components of an exemplary electric drive 100. The electric drive 100 includes a power source 102 to supply power to a generator 104. The power source 102 may include, for example, a diesel engine, a gasoline engine, a natural gas engine, or any other type of rotational source of mechanical energy commonly used in association with electrical machines. The power source 102 may also be used in conjunction with stationary applications and be implemented with, for instance, windmills, hydroelectric dams, batteries, fuel cells, or any other suitable source of energy. The power supplied by the power source 102 is converted into electrical power by the generator 104. In one embodiment, the generator 104 may be a switched reluctance generator configured to generate three phase electrical signals. It is also contemplated that the generator 104 may be an alternating current synchronous generator, an induction generator, a permanent-magnet generator, or any other appropriate type of generator known in the art.

The electrical signals generated by the generator 104 are supplied to a first converter 106. The first converter 106 may in turn convert the electrical signals into a direct current (DC) link voltage on a common bus 108. The first converter 106 includes switches, diodes, and other circuitry for converting the electrical signals provided by the generator 104 into the DC link voltage. As shown in FIG. 1, the first converter 106 is electrically coupled to a first controller 110. The first controller 110 is configured to control the operation of the first converter 106. The first controller 110 may control the DC link voltage on the common bus 108. The common bus 108 provides a positive line 112 and a negative or ground line 114 across which the common bus 108 may communicate the DC link voltage.

Still referring to FIG. 1, a second converter 116 is connected across the common bus 108 to provide electrical power to a switched reluctance (SR) machine 118. The second converter 116 may include a series of transistors or gated switches and diodes (not shown) for selectively enabling one or more phase windings or phases of the SR machine 118. For example, a three-phase SR machine 118 may be driven using the second converter 116 having six switches and six diodes for selectively enabling or disabling each of the three phases of the SR machine 118.

Referring to FIG. 1, the SR machine 118 includes a rotor 120 that is rotatably disposed within a fixed stator 122. In one embodiment, the SR machine 118 is configured to operate as a SR motor. The rotor 120 of the SR machine 118 may be coupled to an output shaft (not shown) which may be, in turn, connected to drive a mechanical load (not shown). Each phase winding or simply phase of the stator 122 of the SR machine 118 may be electrically coupled to the second converter 116. The SR machine 118 may be configured to cause rotation of the rotor 120 in response to signals that are provided to the stator 122 from the second converter 116. However, in various other embodiments, the SR machine 118 may be configured to operate as a SR generator. Further, although FIG. 1 shows only one SR machine 118 but it can be contemplated that the invention would be equally applicable to systems having more than one SR machines.

Still referring to FIG. 1, the second converter 116 is electrically coupled to a second controller 124. The second controller 124 is configured to control the operation of the second converter 116. The second controller 124 may be configured to provide control signals to the second converter 116 to selectively energize one or more phase windings of the SR machine 118. In various embodiments, the second controller 124 is configured to estimate a position and a speed of the rotor 120 of the SR machine 118. The second controller 124 may be configured to provide diagnostic pulses to the second converter 116. The diagnostic pulse is configured to be injected into the phases of the SR machine 118 by the second converter 116. The diagnostic pulse may be a current pulse or a voltage pulse. In one embodiment, the diagnostic pulse is a trapezoidal waveform. Specifically, the second controller 124 may be configured to generate the diagnostic pulse which is injected into at least one idle or non-controlling phase of the stator 122. One or more parameters of the diagnostic pulse, such as duration of the diagnostic pulse, time duration of flat-top portion of the diagnostic pulse, and magnitude, may be configured by the second controller 124.

The first controller 110 and the second controller 124 may be implemented using one or more of a processor, a microprocessor, a microcontroller, a digital signal processor (DSP), a field-programmable gate array (FPGA), an electronic control module ECM, an electronic control unit ECU, or any other suitable means for electronically controlling the first converter 106 and the second converter 116. The first controller 110 and the second controller 124 may be configured to operate according to a predetermined algorithm or set of instructions for operating the electric drive 100 based on the speed and/or position of the rotor 120 relative to the stator 122 and other operating characteristics of the electric drive 100. Such an algorithm or set of instructions may be preprogrammed or incorporated into a memory that is accessible to and/or disposed within the first controller 110 and/or the second controller 124 as is commonly known in the art.

Figure 2:
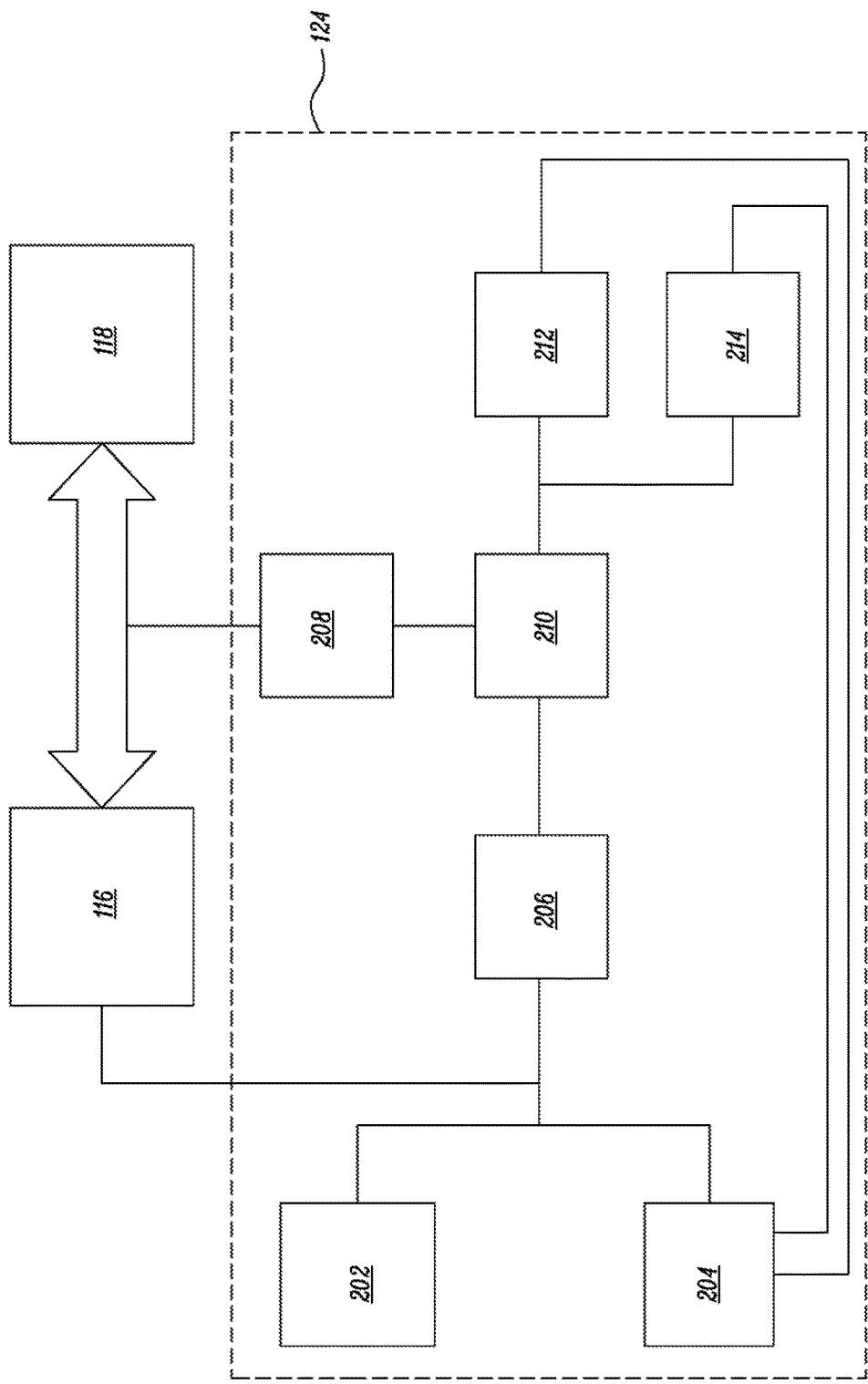
FIG. 2 is schematic illustration of the various components of the electric drive, in accordance with one embodiment of the invention.

FIG. 2 illustrates various components of the electric drive 100 in an exemplary embodiment of the invention. As discussed with reference to FIG. 1, the second controller 124 is configured to determine at least one of the speed of the rotor 120 and the position of the rotor 120 of the SR machine 118. Referring to FIG. 2, the second controller 124 includes a phase control module 202 configured to provide signals to be supplied to one or more phases of the SR machine 118. In one embodiment, the phase control module 202 provides a reference signal to be supplied to an idle or non-controlling phase of the stator 122. The phase control module 202, in some embodiments, may be configured to receive measured values of current flowing through the different phases of the stator 122. The phase control module 202 may be supplied with a feedback from a speed control module (not shown) and/or a torque control module (not shown) as per the implementation of desired control of the SR machine 118.

The second controller 124 includes a diagnostic pulse module 204 configured to generate signals representing the diagnostic pulse. The diagnostic pulse module 204 provides the diagnostic pulse which is injected into at least one idle or non-controlling phase of the stator 122. In one embodiment, the diagnostic pulse is a trapezoidal waveform. In various embodiments, the diagnostic pulse may have a shape other than the trapezoidal shape. The diagnostic pulse module 204 may be configured to provide the diagnostic pulse for injection when the SR machine 118 is operating at zero, approximately at zero, or at an otherwise relatively low machine speed. Further, the diagnostic pulse module 204 may be configured to vary one or more parameters associated with the diagnostic pulse according to feedback pertaining to the last known or most recent assessment of the position and/or the speed of the rotor 120.

Signals from the phase control module 202 and the diagnostic pulse module 204 are provided to the second converter 116 for feeding into the appropriate phases of the SR machine 118. Referring to FIG. 2, the second controller 124 further includes a current estimator module 206 to estimate the current flowing through those phases of the stator 122 into which the diagnostic pulse was injected. The second controller 124 may be configured to provide information related to idle or non-controlling phases to the current estimator module 206. Various intermediate steps known in the art may be undertaken while estimating the current by the current estimator module 206. For example, the current estimator module 206 may estimate the stator current based on preprogrammed relationships between flux, voltage and current, as well as predetermined electrical properties of the SR machine 118. In one embodiment, observer-based estimation technique is used to estimate the stator current.

Still referring to FIG. 2, the second controller 124 includes a measurement module 208 to measure the actual current through those phases of the stator 122 into which the diagnostic pulse was injected. The second controller 124 may be configured to provide information related to idle or non-controlling phases to the measurement module 208. Various techniques of measuring the actual phase current known to a person of ordinary skill in the art may be used. The second controller 124 further includes a current error processing module 210 coupled to the current estimator module 206 and the measurement module 208. The current error processing module 210 may be configured to compute an error between the phase current estimated by the current estimator module 206 and the actual current measured by the measurement module 208. The current error processing module 210 may be implemented using a comparator circuit known in the art. A recursive process may be employed to minimize the error between the estimated phase current and the actual phase current. The error computed by the current error processing module 210 may be used in the subsequent stages to estimate the position and/or the speed of the rotor 120 using observer-based estimation techniques.

Referring to FIG. 2, the second controller 124 includes a position estimation module 212 coupled to the current error processing module 210. The position estimation module 212 may be configured to estimate the rotor position based on the error generated by the current error processing module 210. In one embodiment, the position estimation module 212 may use observer-based estimation technique to estimate the rotor position. When the estimated phase current match the actual phase current, the observer-based estimated rotor position may converge to the corresponding actual rotor position for the SR machine 118. It would be obvious to a person of ordinary skill in the art that the position estimation module 212 may employ other position estimation techniques known in the art to estimate the rotor position. The estimated rotor position may be provided as feedback to the diagnostic pulse module 204 for controlling the operation of the SR machine 118.

In various embodiments, the second controller 124 may utilize the rotor position estimated by the position estimation module 212 for controlling the operation of the SR machine 118. More particularly, the second controller 124 may directly compute, or alternatively, access one or more predefined models, such as lookup tables, maps, or the like, that are preprogrammed in a memory (not shown) and interpolate different rotor positions for different machine states. For example, the predefined models may be able to indicate the rotor position based on a given phase current, phase voltage, decoupled flux value, or the like.

Still referring to FIG. 2, the second controller 124 includes a speed estimation module 214 coupled to the current error processing module 210. The speed estimation module 214 may be configured to estimate the rotor speed based on the error generated by the current error processing module 210. In one embodiment, the speed estimation module 214 may use observer-based estimation technique to estimate the rotor speed. When the estimated phase current match the actual phase current, the observer-based estimated rotor speed may converge to the corresponding actual rotor speed for the SR machine 118. It would be obvious to a person of ordinary skill in the art that the speed estimation module 212 may employ other speed estimation techniques known in the art to estimate the rotor speed. The estimated rotor speed may be provided as feedback to the diagnostic pulse module 204 for controlling the operation of the SR machine 118.

In various embodiments, the second controller 124 may utilize the position estimated by the position estimation module 212 and the speed estimated by the speed estimation module 214 for controlling the operation of the SR machine 118. More particularly, the second controller 124 may directly compute, or alternatively, access one or more predefined models, such as lookup tables, maps, or the like, that are preprogrammed in a memory (not shown) and interpolate different rotor positions and/or rotor speeds for different machine states. For example, the predefined models may be able to indicate the rotor position and/or speed based on a given phase current, phase voltage, decoupled flux value, or the like.

Once the position and the speed of the rotor are obtained, the second controller 124 may be configured to determine other parameters pertaining to the SR machine 118 which may be derived based on the rotor position and/or the rotor speed. Furthermore, the second controller 124 may be configured to control the second converter 116, and energize the phases of the SR machine 118 in accordance with the rotor position information and/or any additional information derived therefrom.

Figure 3:
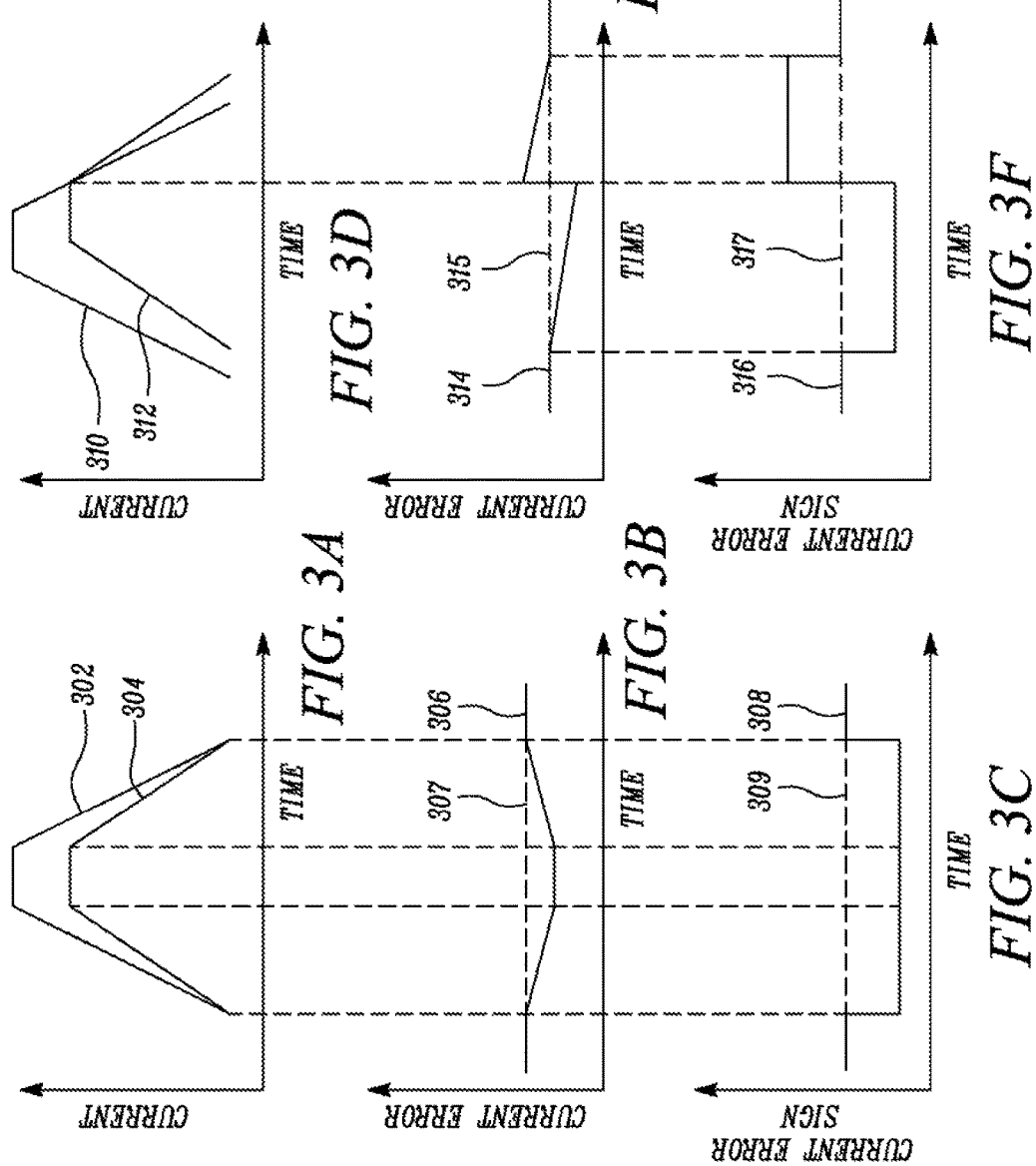
FIGS. 3A to 3F illustrate the various example signals used for estimation of position and speed of a rotor of the SR machine, in accordance with one embodiment of the invention.

FIGS. 3A to 3C illustrate the various example signals used for estimation of rotor position in accordance with one embodiment of the invention. FIG. 3A shows an actual phase current signal 302 that may be measured by the measurement module 208 upon injecting a trapezoidal diagnostic pulse. Further, FIG. 3A shown an estimated phase current signal 304 that may be estimated by the current estimator module 206. Note that in the example embodiments shown in FIGS. 3A to 3C, it is considered that there is no time delay between the measured phase current and the estimated phase current.

FIG. 3B illustrates an error signal 306 generated by the current error processing module 210. The error signal 306 illustrates the error values with respect to a zero error line 307. The error signal 306 is generated by subtracting the actual phase current signal 302 from the estimated phase current signal 304. FIG. 3C illustrates a sign signal 308 which may be generated by the current error processing module 210. The sign signal 308 represents the positive or negative sign of the error signal 306 with respect to a zero line 309. Referring to FIGS. 3B and 3C, the error signal 306 is a strong error signal as the corresponding sign signal 308 is biased towards one side (negative in this example), resulting in faster convergence of the error.

FIGS. 3D to 3F illustrate the various example signals used for estimation of rotor position in accordance with another embodiment of the invention. FIG. 3D shows an actual phase current signal 310 that may be measured by the measurement module 208 upon injecting a trapezoidal diagnostic pulse. Further, FIG. 3D shows an estimated phase current signal 312 that may be estimated by the current estimator module 206. Note that in the example embodiments shown in FIG. 3D to 3F, a time delay is considered between the measured phase current and the estimated phase current FIG. 3E illustrates an error signal 314 generated by the current error processing module 210. The error signal 314 shows the error values with respect to a zero error line 315. The error signal 314 is generated by subtracting the actual phase current signal 310 from the estimated phase current signal 312. FIG. 3F illustrates a sign signal 316 which is generated by the current error processing module 210. The sign signal 316 represents the positive or negative sign of the error signal 314 with respect to a zero line 317. Referring to FIGS. 3E and 3F, the error signal 314 is a strong error signal as the corresponding sign signal 316 is biased towards one side (negative in this example), resulting in faster convergence of the error. Thus, use of trapezoidal diagnostic pulse results in better estimation of the rotor position and/or the rotor speed.

Figure 4:
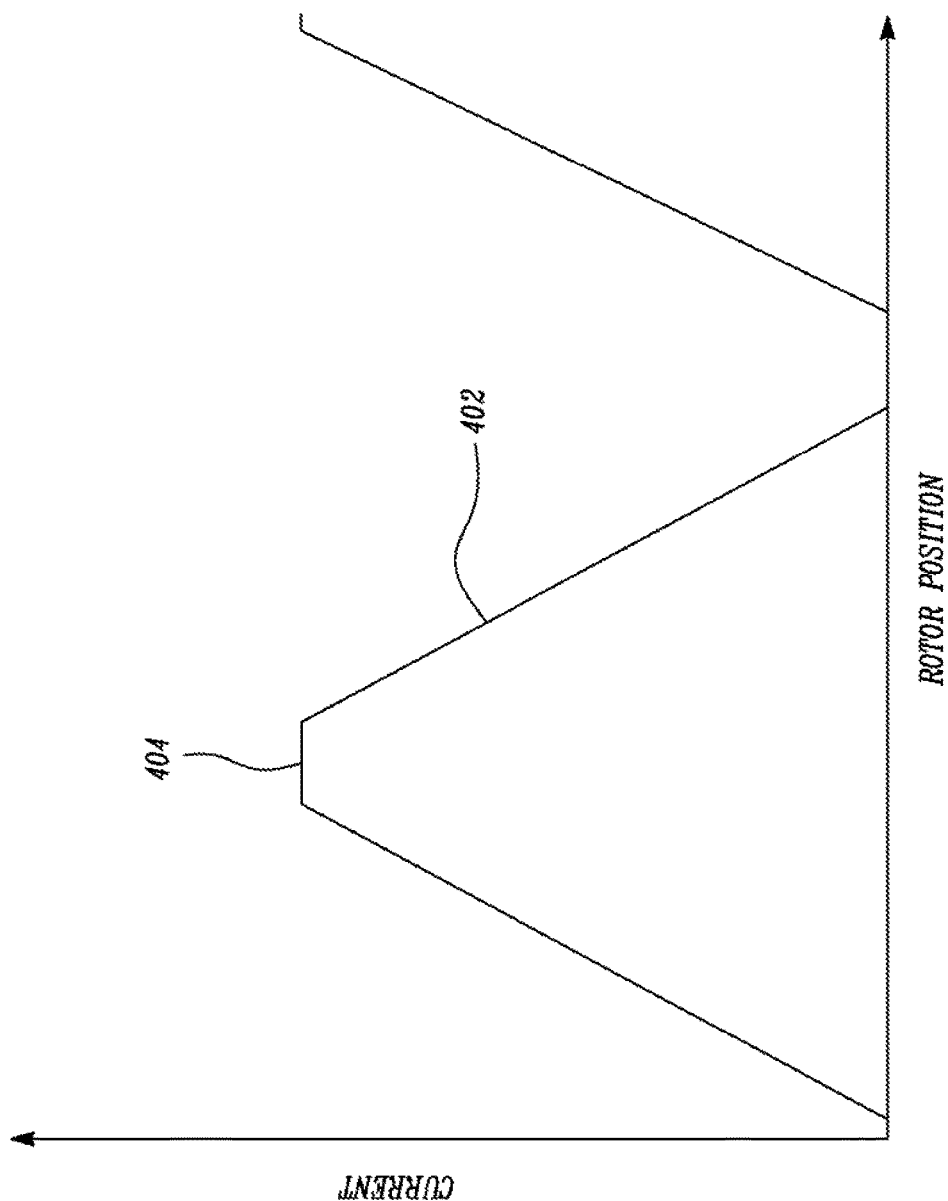
FIG. 4 illustrates an example of an estimated current waveform with respect to position of rotor of the SR machine, in accordance with one embodiment of the invention.
Figure 5:
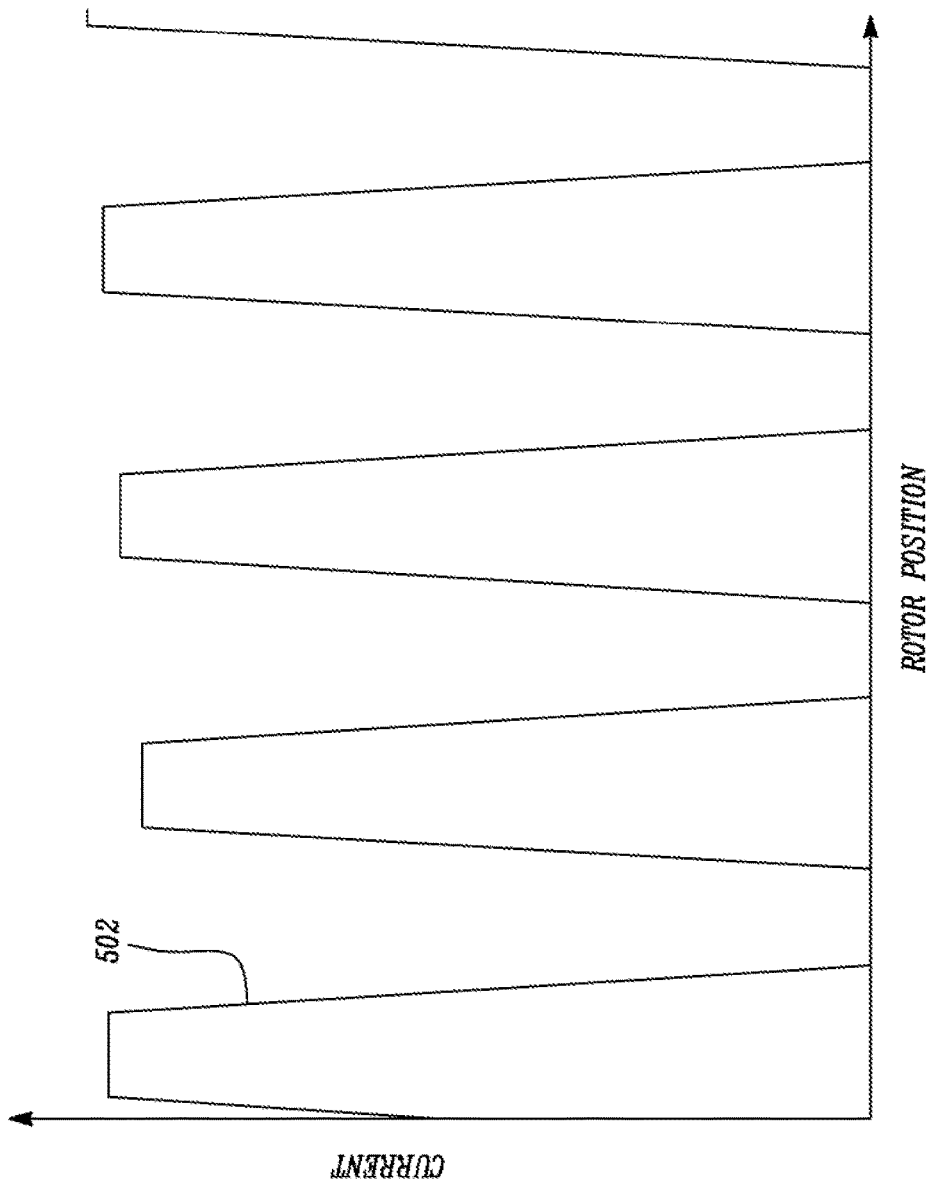
FIG. 5 illustrates another example of an estimated current waveform with respect to position of rotor of the SR machine, in accordance with another embodiment of the invention.

FIG. 4 illustrates an example of an estimated phase current waveform 400 with respect to rotor position in accordance with another embodiment of the invention. The estimated phase current waveform 400 is of trapezoidal shape with a flat-top portion 402. FIG. 5 illustrates another example of an estimated phase current waveform 502 with respect to rotor position in accordance with another embodiment of the invention.

Figure 6:
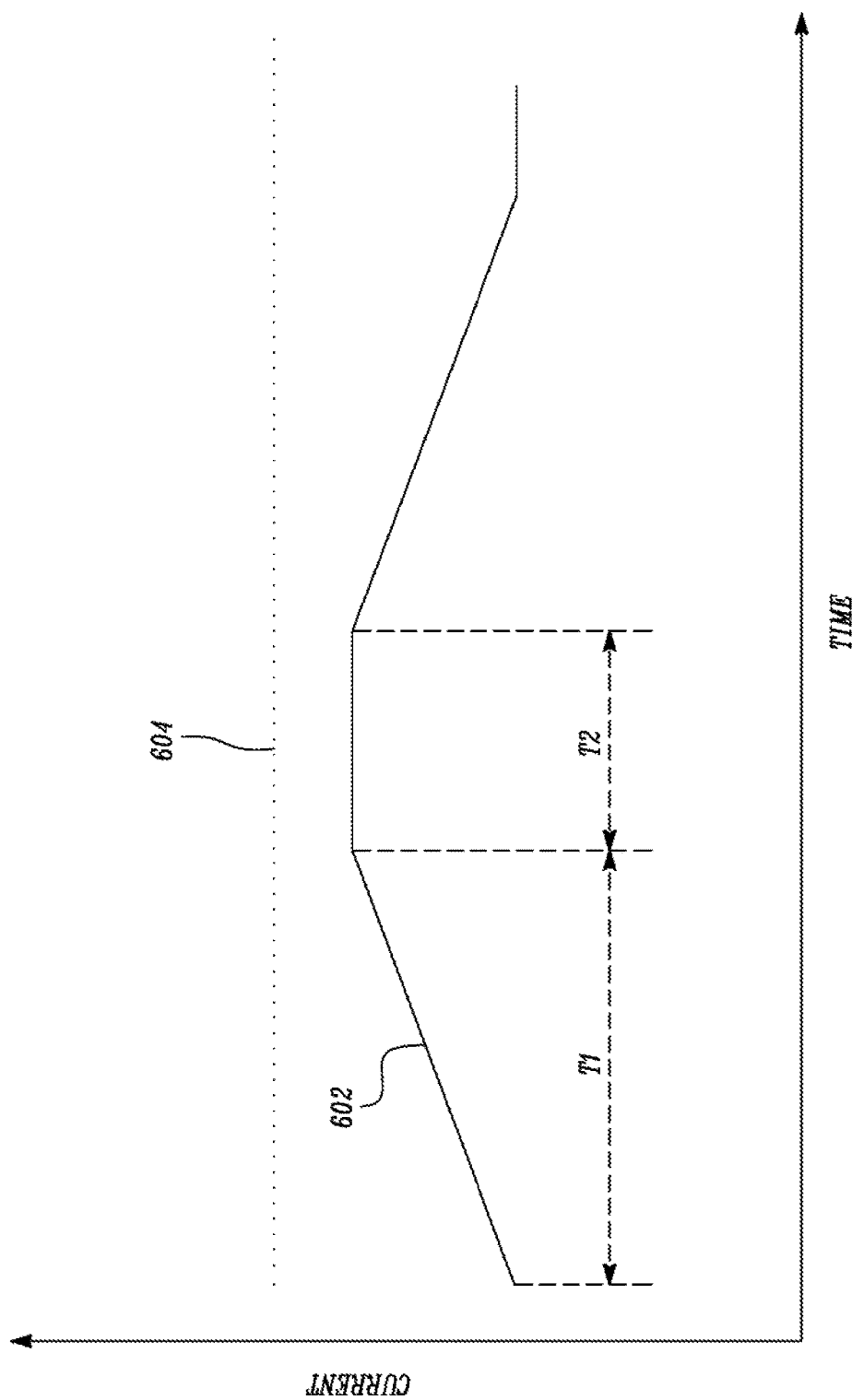
FIG. 6 illustrates an example of a diagnostic pulse waveform with respect to time, in accordance with one embodiment of the invention.

FIG. 6 illustrates an example diagnostic pulse waveform 602 with respect to time in accordance with an embodiment of the invention. The second controller 124, in various embodiments, is configured to vary one or more parameters associated with the diagnostic pulse for better estimation of the rotor position and/or rotor speed. In one embodiment, the second controller 124 is configured to vary a time duration corresponding to a flat-top portion of the waveform 602. Referring to exemplary waveform 602, the second controller 124 controls a time duration T1 of a rising edge of the waveform 602, keeping the frequency of the waveform 602 constant. The time duration T1 represents the rise time of the diagnostic pulse waveform 602. A person of ordinary skill in the art will understand that there can be various other ways of controlling the time duration corresponding to the flat-top portion of the waveform 602.

Referring to FIG. 6, the second controller 124 may configure an injection target 604 to restrict a rise of the diagnostic pulse waveform 602. In one embodiment, the injection target 604 may be a maximum injection current predetermined by the controller in accordance with one or more parameters of the SR machine 118. In various embodiments, the second controller 124 may vary the injection target 604 in order to adjust the time duration of the flat-top portion of the waveform 602. Referring to FIG. 6, the injection target 604 is set higher than the maximum value of the diagnostic pulse waveform 602, thus the flat-top portion is triggered by the expiry of the rise time, i.e. time duration T1. Time duration of the flat-top portion is shown as T2 in FIG. 6. In various embodiments, the second controller 124 may be configured to vary at least one of the time duration T1 or the injection target 604 to vary the flat-top portion of the waveform 602.

Figure 7:
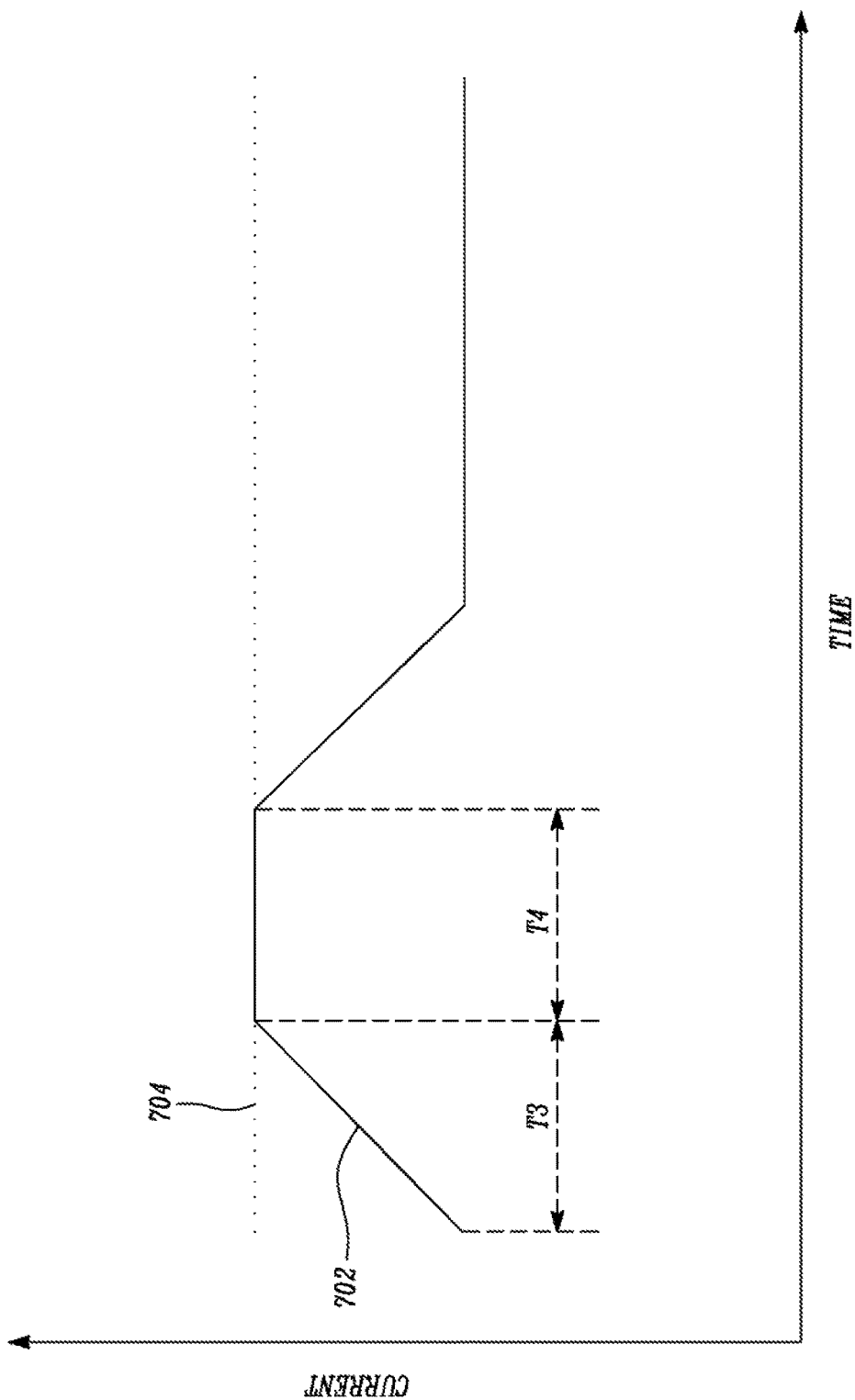
FIG. 7 illustrates another example of a diagnostic pulse waveform with respect to time, in accordance with another embodiment of the invention.

FIG. 7 illustrates another example diagnostic pulse waveform 702 with respect to time in accordance with an embodiment of the invention. In this embodiment, the second controller 124 configures the injection target 704 at a value such that the diagnostic pulse waveform 702 reaches the injection target 704 after time duration T3 from the start, which is less than the rise time of the waveform 702. In other words, the flat-top portion of the waveform 702 is triggered by the injection target 704. This results in a flat-top portion having a longer time duration T4 as compared to that with a higher value of the injection target 704. Thus, the second controller 124 may control the time duration of the flat-top portion of the waveform 702 for better estimation of rotor position and/or rotor speed.

INDUSTRIAL APPLICABILITY

In general, the foregoing disclosure finds utility in various applications relating to switched reluctance (SR) machines or any other suitable electric machine being employed as motors and/or generators. In particular, the disclosed systems and methods may be used to provide more efficient control of electric machines such as SR machines that are typically employed in association with the electric drives of power generation machines, industrial work vehicles, and any other types of mobile as well as stationary machines commonly used in the art.

More specifically, the present disclosure provides a more simplified and accurate sensorless approach of estimating the position and the speed of the rotor of an SR machine. Still further, the systems and methods disclosed herein serve to provide a more accurate and reliable estimation of the rotor position and rotor speed such that operations of the SR machine thereafter are carried out more efficiently.

Figure 8:
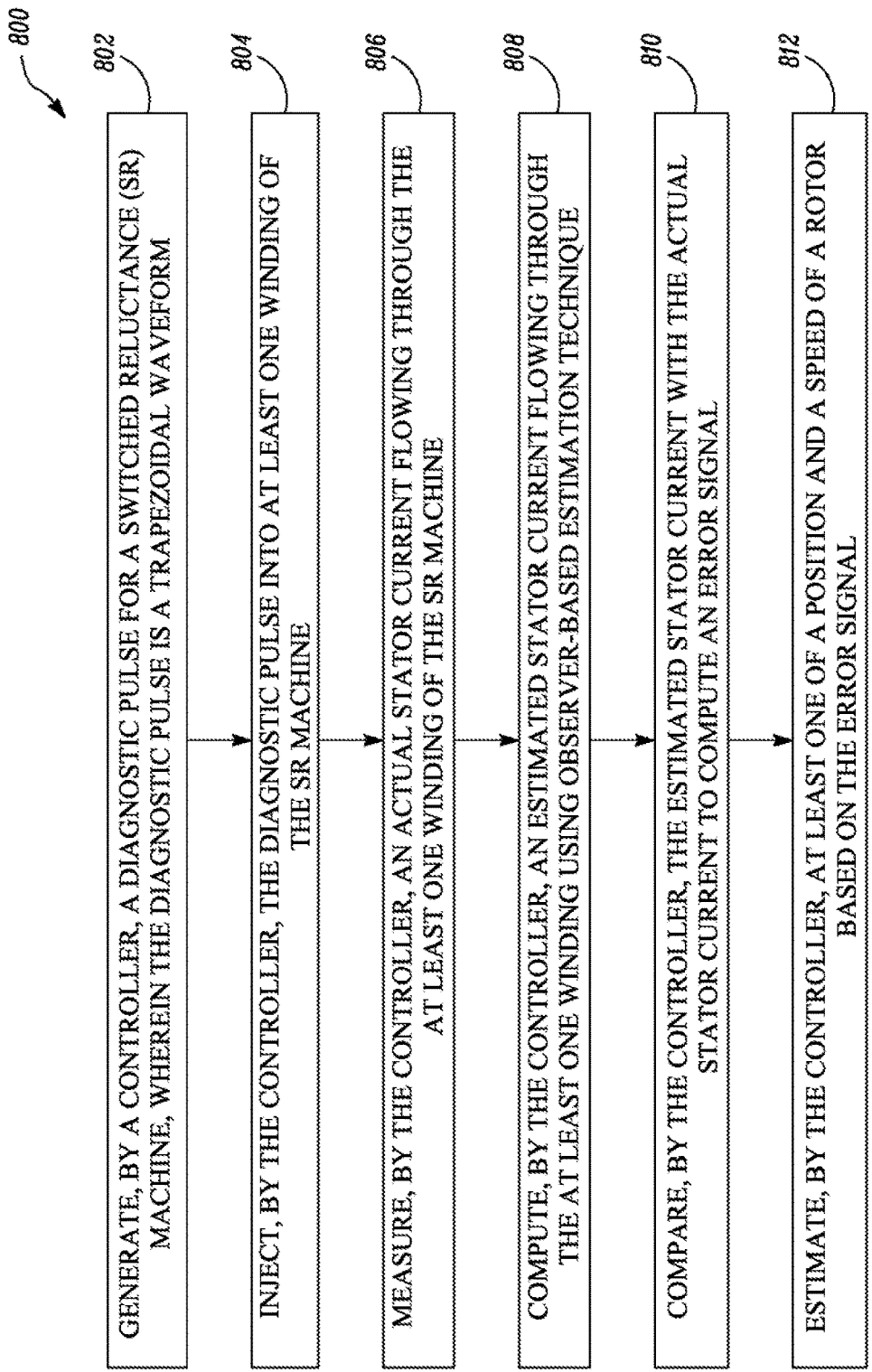
FIG. 8 is a flowchart of a method for estimating a position and a speed of a rotor of the SR machine, in accordance with the concepts of the present disclosure.

Referring to FIG. 8, a method 800 of estimating the position and the speed of the rotor 120 of the SR machine 118 is illustrated. At step 802, the second controller 124 generates a diagnostic pulse for the SR machine 118. The diagnostic pulse is a trapezoidal waveform. At step 804, the second controller 124 injects the diagnostic pulse into at least one stator winding of the SR machine 118. The diagnostic pulse may be injected into at least one idle or non-controlling phase of the stator 122. In various embodiments, the diagnostic pulse may be a current pulse or voltage pulse. At step 806, the second controller 124 measures the actual stator current flowing through the at least one stator winding in which the diagnostic pulse was injected. The second controller 124 includes the measurement module 208 configured to measure the actual stator current.

At step 808, the second controller 124 is configured to estimate the stator current flowing through the at least one stator winding in which the diagnostic pulse was injected. The second controller 124 is provided with the current estimator module 206 for computing the estimated stator current. In one embodiment, observer-based estimation technique is used to estimate the stator current. At step 810, the second controller 124 is configured to compute an error between the stator current estimated by the current estimator module 206 and the actual stator current measured by the measurement module 208. The second controller 124 is provided with the current error processing module 210 to compute the error. A recursive process may be employed to minimize the error between the estimated stator current and the actual stator current. At step 812, the error computed by the current error processing module 210 is used to estimate at least one of the position and the speed of the rotor 120.

While aspects of the present disclosure have been particularly shown, and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of estimating a position and a speed of a rotor of a Switched Reluctance (SR) machine, the SR machine comprising the rotor, a stator and at least one winding, the method comprising;
    generating, by a controller, a diagnostic pulse for the SR machine, wherein the diagnostic pulse is a trapezoidal waveform;
    injecting, by the controller, the diagnostic pulse into the at least one winding;
    measuring, by the controller, an actual stator current flowing through the at least one winding of the SR machine;
    computing, by the controller, an estimated stator current flowing through the at least one winding using observer-based estimation technique;
    comparing, by the controller, the estimated stator current with the actual stator current to compute an error signal; and
    estimating, by the controller, at least one of the position and the speed of the rotor based on the error signal.

2. The method of claim 1 further including controlling a time duration corresponding to a flat-top portion of the diagnostic pulse.

3. The method of claim 2, wherein the time duration corresponding to the flat-top portion is controlled based on at least one of a rise time duration of the diagnostic pulse and an injection target.

4. The method of claim 1 further including controlling the SR machine based on at least one of the position and the speed of the rotor.

5. The method of claim 1 further including injecting the diagnostic pulse into the at least one winding during an idle period.

6. The method of claim 1, wherein the diagnostic pulse is a current pulse.

7. A controller for estimating a position and a speed of a rotor of a Switched Reluctance (SR) machine, the SR machine comprising the rotor, a stator and at least one winding, wherein the controller is electrically coupled to the SR machine, the controller configured to:
    generate a diagnostic pulse for the SR machine, wherein the diagnostic pulse is a trapezoidal waveform;
    inject the diagnostic pulse into the at least one winding;
    measure an actual stator current flowing through the at least one winding of the SR machine;
    compute an estimated stator current flowing through the at least one winding using observer-based estimation technique;
    compare the estimated stator current with the actual stator current to compute an error signal; and
    estimate at least one of a position and a speed of the rotor based on the error signal.

8. The controller of claim 7 further configured to control a time duration corresponding to a flat-top portion of the diagnostic pulse.

9. The controller of claim 8 further configured to control the time duration corresponding to the flat-top portion based on at least one of a rise time duration of the diagnostic pulse and an injection target.

10. The controller of claim 7 further configured to control the SR machine based on the estimated position of the rotor.

11. The controller of claim 7 further configured to control the SR machine based on the estimated speed of the rotor.

12. The controller of claim 7 further configured to inject the diagnostic pulse into the at least one winding during an idle period.

13. The controller of claim 7, wherein the diagnostic pulse is a current pulse.

14. An electric drive comprising:
    a switched reluctance (SR) machine comprising a stator, a rotor and at least one phase winding, the rotor rotatably disposed in proximity to the stator; and
    a controller in electrical communication with the SR machine, the controller configured to:
        generate a diagnostic pulse for the SR machine, wherein the diagnostic pulse is a trapezoidal waveform;
        inject the diagnostic pulse into the at least one winding;
        measure an actual stator current flowing through the at least one winding of the SR machine;
        compute an estimated stator current flowing through the at least one winding using observer-based estimation technique;
        compare the estimated stator current with the actual stator current to compute an error signal; and
        estimate at least one of a position and a speed of the rotor based on the error signal.

15. The electric drive of claim 14, wherein the controller is configured to control a time duration corresponding to a flat-top portion of the diagnostic pulse.

16. The electric drive of claim 15, wherein the controller is configured to control the time duration corresponding to the flat-top portion based on at least one of a rise time duration of the diagnostic pulse and an injection target.

17. The electric drive of claim 14, wherein the controller is configured to control the switched reluctance machine based on the estimated position of the rotor.

18. The electric drive of claim 14, wherein the controller is configured to control the switched reluctance machine based on the estimated speed of the rotor.

19. The electric drive of claim 14, wherein the controller is configured to inject the diagnostic pulse into the at least one winding during an idle period.

20. The electric drive of claim 14, wherein the diagnostic pulse is a current pulse.

* * * * *